T. LINDSLEY.
Machine for Tunneling Rock.

Patented June 12, 1866.

T. LINDSLEY.

Machine for Tunneling Rock.

Patented June 12, 1866.

Witnesses:

Inventor.

T. LINDSLEY.
Machine for Tunneling Rock.

Patented June 12, 1866.

T. LINDSLEY.
Machine for Tunneling Rock.

Patented June 12, 1866.

Witnesses:

Inventor.
Thales Lindsley

T. LINDSLEY.
Machine for Tunneling Rock.

Patented June 12, 1866.

T. LINDSLEY.
Machine for Tunneling Rock.

Patented June 12, 1866.

Witnesses:

Inventor,
Thales Lindsley

T. LINDSLEY.
Machine for Tunneling Rock.

No. 55,514. Patented June 12, 1866.

T. LINDSLEY.
Machine for Tunneling Rock.

Patented June 12, 1866.

T. LINDSLEY.
Machine for Tunneling Rock.

Patented June 12, 1866.

Witnesses:

Inventor.

UNITED STATES PATENT OFFICE.

THALES LINDSLEY, OF ROCK ISLAND, ILLINOIS.

IMPROVED MACHINE FOR TUNNELING ROCK.

Specification forming part of Letters Patent No. 55,514, dated June 12, 1866.

*To all whom it may concern:*

Be it known that I, THALES LINDSLEY, of the city of Rock Island, State of Illinois, have invented a new and useful Improvement in Contrivances for Tunneling Rock, &c.; and I declare the following, with Plates 1, 2, 3, 4, 5, 6, 7, 8, and 9, to be a description thereof.

The several plates and figures are as follows, viz:

Plate 1 presents, Figure 1, side elevation of the entire machine.

Plate 2 presents, Fig. 3, drill-wheel; Fig. 8, drain drill or cutter; Fig. 9, water spouts and pipes to convey water into the channels of the heading.

Plate 3 presents, Fig. 10, a central vertical section of frame-piece A; Fig. 11, frame-piece A; Fig. 12, a cross-section of the leg of frame-piece A; Fig. 13, edge view of the same; Figs. 14, 15, and 16, wedge index or indicator.

Plate 4 presents, Fig. 22, supporting-frame of the oscillating engines or cylinders; Fig. 27, plan of the yoke $c'$, part of said supporting-frame, and by which it is held to the ram-cylinders B.

Plate 5 presents, Fig. 34, plan of ram-cylinders with connecting-pipes.

Plate 6 presents, Fig. 40, ram and sections thereof; Fig. 41, yoke; Fig. 43, cutting-drill.

Plate 7 presents, Fig. 48, section of drill-wheel; Fig. 49, face of same; Figs. 50 to 55, sectional parts of the drill-wheel; Figs. 56 to 60, drills and their appurtenances; Fig. 61, key-wedge; Fig. 62, grade-wedge; Figs. 63 and 64, head-wedge and its matrix.

Plate 8 presents, Figs. 65, 66, and 67, front face of cam-wheel and details thereof; Figs. 68 to 72, drill-shaft guides or feathers; Fig. 78, ram-guide and drill-gage.

Plate 9 presents a vertical longitudinal section through the parts that connect the oscillating engines with the working arrangements.

The machine, in general terms, is devised, first, to cut circular concentric channels in vertical planes of rock, and thus form circular concentric rings of the heading; second, to disrupt these concentric rings of rock, and thus prepare them for removal; third, to detach the fragments of the disrupted rings and deliver them for transportation; fourth, to drill holes in the crown of the excavation made, and thus provide seats for brackets; fifth, to cut a trench in the bottom of the tunnel, &c., opened, and thus obtain a drain for the water; sixth, to utilize compressed air as a motor, and thus secure perfect ventilation; seventh, to operate its drills in jets of water, and thus preserve their temper, prevent the diffusion of dust, and wash the débris from the channels into the trench aforesaid. The invention may, therefore, be not inaptly denominated a "tunneling-machine," and designed to work circular tunnels for mining, railroad, and other purposes.

Figure 1:
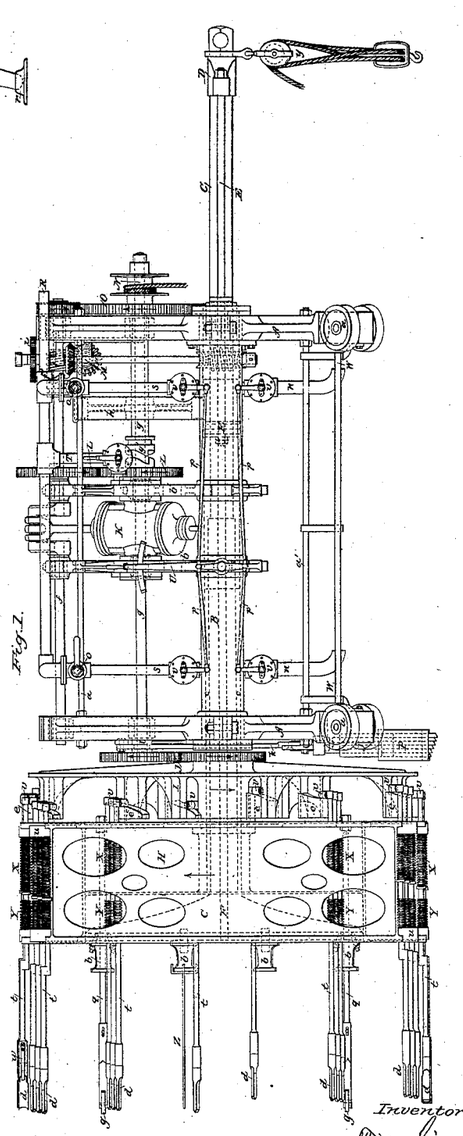
Figure 2:
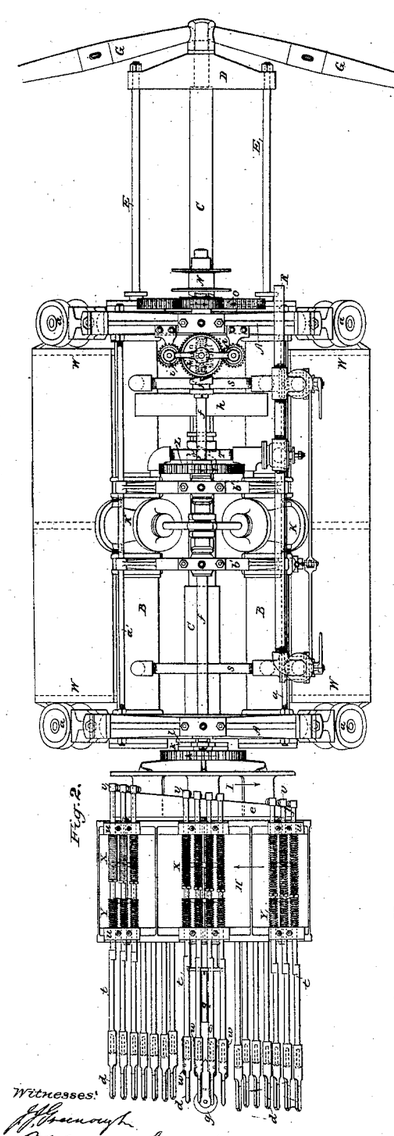
Fig. 2, plan of the same.

The details of its construction are as follows, viz:

Plate 1 shows a plan and a side elevation of the entire machine.

A A, Fig. 1, designate the supports upon which the structure rests. There are two of them. Each has the same outline as the other. A front elevation of one of them is seen in Fig. 5, which represents the rear support, though exhibiting a rear view of the machine. These two supports may be regarded as the frame of the tunneler, and will herein be so called. The main feature of each of these supports is four radial projections extending from a common center out nearly to the circumference of the circle of the tunnel. The two upper are denominated "arms;" the two lower, "legs." To the frame, therefore, are four arms and four legs. The arms to each support are connected by two brace-pieces, that serve, as will be seen, as bearings for the boxes of the driving-shaft and of the counter-shaft. In the end of each of these arms is a rectangular groove, sunk perpendicularly to the plane of the support, and constitutes the seat of the key-wedge, Fig. 61, by which the machine is fastened in the excavation. On the extremity of each leg are two beveled wheels, Plates 1 and 2, and Figs. 1, 2, 3, and 5, disposed upon the upper and under sides thereof, connected by an axle passing through the foot at right angles to the face of the same. These friction-wheels lie by sets or pairs in the longitudinal radial planes of the tunnel, rest upon the curved sides of it without rails, unless the rock is quite friable, and in the movements of the machine backward and forward bear the whole weight of it. Under the end of each leg, and between the two friction-wheels, is inserted a grade-wedge, Fig. 62, upon which the machine rests when stationary, by which it is brought to the horizontal and grade levels, and upon the removal of which the friction-wheels aforesaid take the weight of the machine again.

Figures 17, 18:
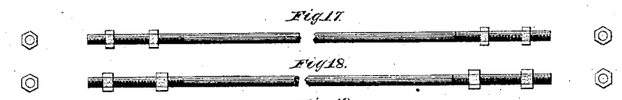
Figs. 17 and 18, arm-rods and leg-rods of the frame-pieces, the rods $a'$ of Fig. 1.
Figure 21:
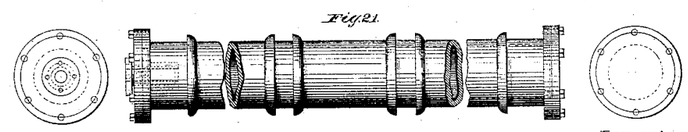
Fig. 21, ram-cylinders.

The supports which constitute the frame of the tunneler are united by brace-rods, two for the arms and two for the legs. These are known as "arm-rods," and seen at $a$, Fig. 1, and as "leg-rods," and seen at $a'$, Fig. 1, and fully represented by Figs. 17 and 18. These supports are further united and braced by the ram-cylinders, two in number, disclosed in Figs. 1 and 2 at B B B, presented endwise in Figs. 3 and 5, and drawn in full in Fig. 21. An inspection of this last figure, 21, coupled with a recurrence to Figs. 3 and 5, will show better than language the relation of these cylinders to the frame and the rigidity they impart to it. Much depends upon the inflexibility of the frame. The bracing-rods and the ram-cylinders guarantee it.

Figure 19:
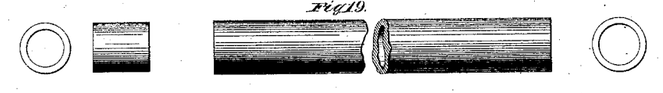
Fig. 19, ram-sleeve forward, or axle-sleeve, for the cam and the drill wheels, also ram-sleeve rear, or box-sleeve.
Figure 20:
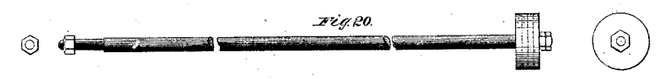
Fig. 20, piston-rod and piston of the ram-cylinders.

In the center of each support is an orifice, (seen in Fig. 11,) with nine inches in its area. This orifice in the front half of the frame receives the ram-sleeve hereinbefore named the "axle-sleeve," Fig. 19, also $c\ c\ c$, Figs. 1 and 2, and in the rear half the ram-sleeve heretofore designated as the "box-sleeve," Fig. 19, also, $c$ solus, Fig. 1, and $cc$, Fig. 7. The former is several feet in length, while the latter need not extend a foot. Both fit closely, but not tightly, in the frame. The box-sleeve is stationary. It serves but one purpose—that of a bearing to the ram-shaft by the rear support. The axle-sleeve is movable, though not otherwise than longitudinally. It is kept from turning by a feather in the orifice. Like the former sleeve, it becomes the bearing, also, of the ram-shaft, which passes through both of them and oscillates and revolves in them, as will appear.

The axle-sleeve, unlike the box-sleeve, has several offices. Where it projects beyond the front support it takes the place of an axle to the cam-wheel I, Figs. 1, 2, 6, and 65, and to the drill-wheel H, Figs. 1, 2, and 3, and Figs. 48 and 49. It also constitutes the seat of the drain-drill guide, Fig. 67, which holds the cam-wheel in place, and of the grooved collar, Fig. 50, which prevents a longitudinal motion of the drill-wheel on its axle—the sleeve under review. This axle-sleeve is further telescopic in its functions. Its only motion—a longitudinal one—is given by and is simultaneous with that of the ram. Being the journal upon which the cam and the drill-wheels rest, whenever it advances or recedes it must carry these wheels with it. The ram, however, as will be shown, can, at the will of the engineer, be freed from this alliance by drawing the key of the ram-guide, and thus oscillate independently. Through these two sleeves the ram-shaft C, Figs. 1 and 2, also Fig. 40, passes in, taking its place in the machine, and in them, as tubular boxes, it performs its useful functions.

Figures 22, 27:
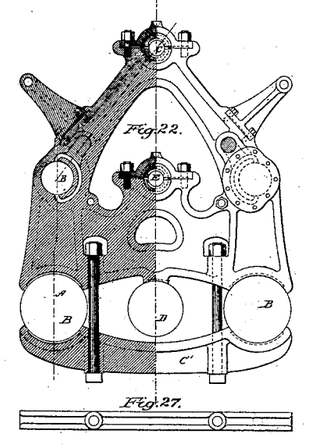
Figures 23, 24, 25, 26, 30:
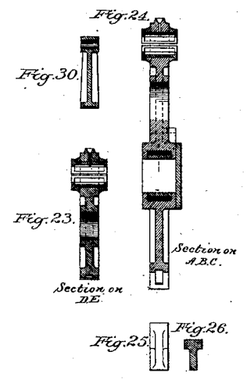
Figs. 23, 24, 25, 26, and 30, sections of said engine-frames.
Figure 28:
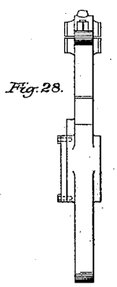
Fig. 28, edge view of this engine-frame.
Figure 29:
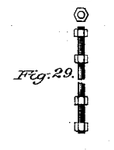
Fig. 29, bolt uniting the yoke $c'$ to the upper part of the engine-frame.
Figure 31:
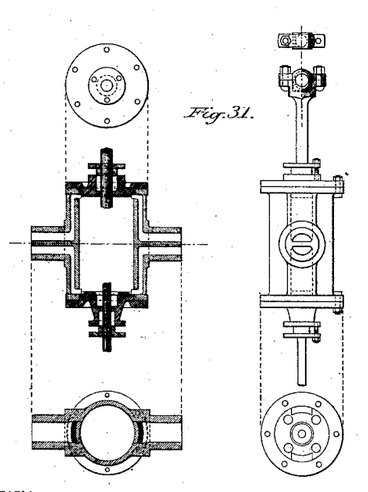
Fig. 31, elevation and section of said oscillating engine.
Figures 32, 33:
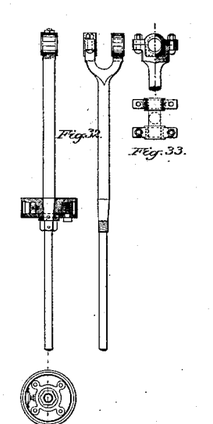
Figs. 32 and 33, parts of the same.
Figure 34:
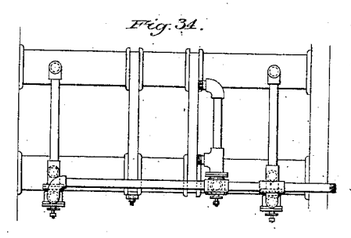
Figure 35:
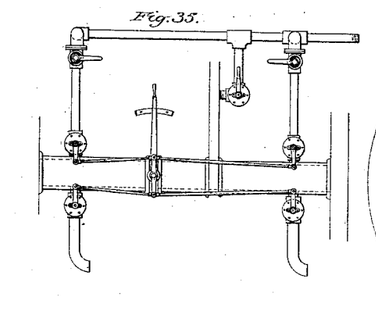
Fig. 35, valve-gear.
Figure 36:
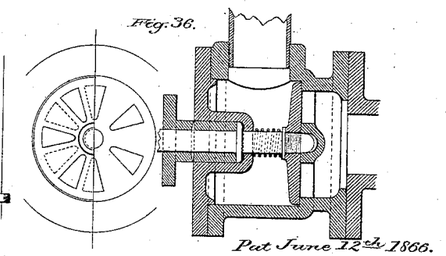
Fig. 36, plan and section of valve enlarged.
Figure 37:
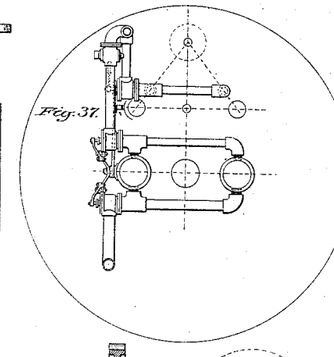
Fig. 37, cross-elevation of pipes and valve-gear.

Upon the ram-shaft and upon the ram-cylinders rest two other supports. (Seen in position at $b'\ b'\ b'\ b'$, Figs. 1 and 2, and in elevation and in section in Figs. 4, 22, 23, 24, 25, 26, 27, 28, 29, and 30.) These supports, taken with the yokes $e'$, Figs. 4 and 22, constitute the frame for the oscillating cylinders K K, Figs. 4 and 31, and are herein described as the "engine-frame." The drawings of this important part of the machine are so full that no further explanation is required. The yoke $e'$, it will be remarked, is the real novelty in the frame, and embodies great merit from its simplicity and efficiency. It should be also noticed that the central projection of the upper portion of each of the supports rests upon the ram-shaft, thus preventing any deflection in this shaft and increasing the breadth of seat for the engine-frame. The peculiar construction of this frame, coupled with its hold upon the ram-cylinders and the ram-shaft, makes it a part of these massive bases and forestalls any vibrations in the engines. Between these two supports, constituting the frame just mentioned, are suspended on trunnions the two oscillating cylinders seen in position at K K K, Figs. 1 and 2, in section at K K, Fig. 4, and also further and completely presented in Fig. 31. These cylinders, taken together, are herein designated as the "engines." These engines, with their piston-rods, are so clearly shown in the figures cited, and in Figs. 32 and 33, that no further description is necessary. They supply the power that works the bracket-drill seen in Figs. 7 and 38, the drag-pulley, as seen at N N, Figs. 1 and 2, also at H, Figs. 73 and 76, the drain-drill, as seen at P, Figs. 1 and 8, also, with details, in Fig. 39, together with the feed-motion, the ram, the drill-wheel, and the cam-wheel, when these three are made to revolve. Being the source of so many and so important movements, the necessity of having their frame firm and inflexible is, perhaps, now evident. The arm-rods pass through the radial extension of the engine-frame from the counter-shaft as a center, as exhibited in section by Fig. 4.

Stretching between the supports constituting the frame of the machine, and passing through them in boxes, are the driving or crank shaft *f f*, Figs. 1 and 2, and the counter or telescopic shaft *g g*, Fig. 1. The former is seen in position at *f f*, Figs. 1 and 2, and fully at *f f*, Fig. 73. The latter is also seen in position at *g g*, Fig. 1, and fully at *g g*, Fig. 73. From the crank-shaft as an axis motion is communicated to the bracket-drill, the feed-motion, the ram, the drill-wheel, the drag-pulley, and the counter-shaft. From the counter-shaft as an axis motion is given to the fly-wheel, (see Fig. 74, and *h h*, Figs. 1 and 2,) the drain-drill, the cam-wheel, and the drill-shafts and drills. These shafts pass through, in bearings, the engine-frame, as may be observed at *f f* and *g g*, Fig. 4, and in Fig. 73. They have, therefore, respectively four bearings, and work *ad libitum* without vibration.

Figures 73, 74, 75, 76, 77:
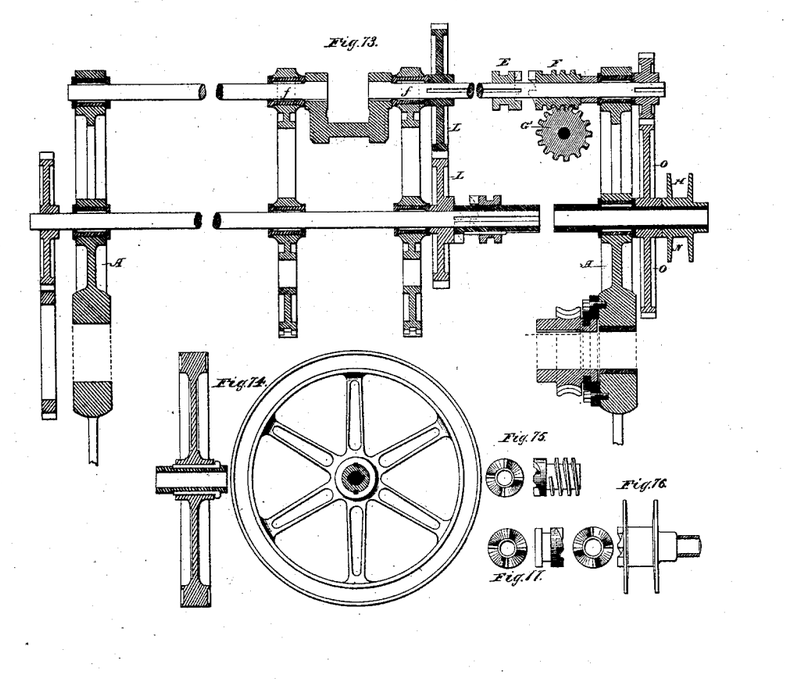
Fig. 74, fly-wheel.
Figs. 75, 76, and 77, details of preceding.

Upon the crank-shaft, and between the rear support of the engine-frame and the rear support of the main frame, is the spur-wheel L. (Seen in place in Figs. 1, 2, and 73.) This is keyed to the shaft, and meshes into the spur-wheel of the counter-shaft, thus imparting motion to it, and when clutched by *g'*, Figs. 1 and 73, transferring it to the fly-wheel, the drain-drill, &c. Next in order on this shaft, and near the worm F, Fig. 73, is a clutch. (Seen at *f'*, Figs. 1 and 2, and clearly at E, Fig. 73.) This clutch is keyed to the shaft, revolves with it, and connects with the worm F, just noted. The worm F is loose upon the shaft and communicates no motion to the gear dependent on it until seized by the clutch. Then it imparts action to the worm-wheel, (seen in position at G', Fig. 7, and in Fig. 73,) then to the bevel-gear *j'*, Fig. 7, and so to the feed-motion below and to the bracket-drill above. The bracket-drill is presented in Figs. 1, 2, 7, and 38. It embraces all in Figs. 7 and 38 above the worm F. Its frame consists of an extension of the vertical pinion-shafts of the feed-motion and of two tie-beams, drawn above and below the spur-wheels *i i i*, Figs. 2 and 7. The two pinions take their motion from the vertical worm-shafts by means of clutches beneath, (not shown in the drawings,) and communicate it to the large wheel between them. This wheel rests upon the cross-beam below and extends to that above. Its axle is a long hollow cylinder, grooved for a feather, and extending from one cross-beam to the other. It is cast solid with the wheel or firmly keyed to it. Through the upper beam is a vertical orifice at its center having a rectangular thread cut in it. Into this orifice is screwed the drill-shaft. This is simply a long screw whose lower part passes down through the hollow axle of the central gear-wheel and is feathered there, and whose upper part projects just above the face of the beam, and carries a drill slotted into its head, constructed and operating somewhat upon the principle of the auger. The drill-shaft, upon working, screws the drill-bit into the rock, and thus literally bores a hole into it. The form of this drill or bit, as used by me, is perhaps not a novelty, but the chemical constitution of it probably is. The difficulty lies in forging and tempering it. The cutting-face is hardened steel, thin as a wafer; the body, the softest wrought-iron. Both wear *pari passu*, and the bit remains sharp till entirely worn out. One pinion drives the drill up and into the rock; the other brings it down and out of the rock to its first position.

Figure 38:
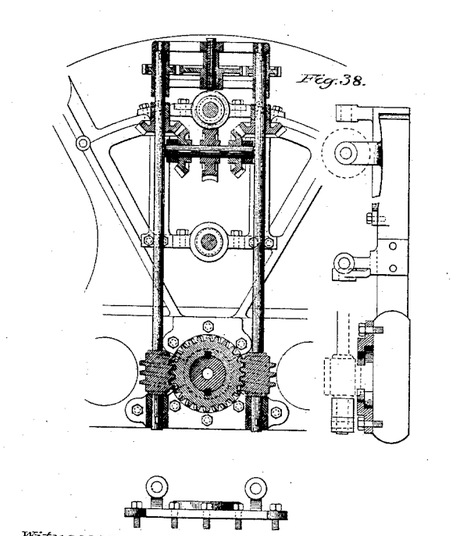
Fig. 38, bracket-drill and feed-motion, latter for revolving the ram and with it the drill-wheel.

The feed-motion is also presented in Figs. 1, 2, 7, and 38. It includes all in these figures adjacent to and below the worm F. Like the bracket-drill, it is supported against the rear part of the main frame by lugs or projections, as shown in Fig. 38. Its combination is so well illustrated in Figs. 7 and 38, and its position in the machine is so sharply defined in Figs. 1 and 2, that I am relieved from additional specification. Motion, it will be noticed, is transferred from this combination to the bracket-drill above and to the ram-shaft O below. The worm-wheel inclosing this shaft and feathered movably to it has upon its rear face a grooved collar cast and finished as a part of its hub. Into this groove a fixed clutch (seen in section in Figs. 38) enters, and thus holds the wheel from oscillating with the ram-shaft.

Upon the rear end of the crank-shaft, where it projects beyond the main frame, is the driving-pinion of the spur-wheel, into which the flanged drum of the drag fully clutches. This pinion is seen in position in Figs. 1 and 2, in elevation at O in Fig. 5, and in section in Fig. 73. It is keyed to the shaft and revolves with it. It imparts motion to the drag-pulley, and performs no other office.

The counter-shaft is telescopic in its construction, consisting of a shaft proper and a sleeve. This sleeve incloses it from near the counter spur-wheel to its rear end, is fastened to it, and when clutched to said spur-wheel revolves with it, thus giving motion to the fly-wheel. The shaft admits of a longitudinal movement also, while the sleeve does not. Upon the former rest the driving-wheel J, the cam *l*, and the counter spur-wheel L, Figs. 2 and 1; upon the latter the clutch aforesaid, the fly-wheel, the spur-wheel *o*, and the drum N. The revolutions of the shaft and the sleeve are coincident and simultaneous—both rest and work together. This shaft, as Fig. 73 shows, extends at each end beyond the frame A. Upon its projection, to the rear of the frame A, is the rectangular grooved pulley N. (Seen in position in Figs. 1 and 2 and in section and place in Figs. 73 and 76.) This is the "drag-pulley," so called. It revolves loosely upon the sleeve just described, and when clutched to the spur-wheel works. On it is wound a rope, at the end of which is a clamp for seizing and hauling stone. This rope and clamp, when not in use, are hung upon the inside of one of the legs, and thus put out of the way during the ingress and egress of the engineer under the machine in the operation of cutting the concentric channels. Next in order upon this telescopic shaft is the large spur-wheel o. (Seen in place in Figs. 1 and 2, in elevation in Fig. 5, and in section and position in Fig. 73.) Like the drum, it revolves loosely upon its sleeve-axle. It receives motion from the pinion O and communicates it to the grooved pulley. It has, therefore, but one duty—that of moving, clutched to it, the drum aforesaid.

Within the main frame, and between its rear part and the engine-frame, occupying a central position, is the fly-wheel $h$ $h$, Figs. 1 and 2. This is keyed to its axle-sleeve, and revolves when the counter spur-wheel is clutched, as appears in Fig. 73. The office of the balance-wheel needs no explanation. Proceeding forward on the counter-shaft, we find at the terminus of the sleeve a movable clutch feathered to it, which locks, at the pleasure of the engineer, into the counter-wheel, and thus sets the sleeve and the counter-shaft in revolution. Adjoining this clutch is the counter spur-wheel itself, resting on the counter-shaft and turning freely upon it. This wheel is the connecting motor-link between the two shafts, and at all times revolves with the spur-wheel of the crank-shaft. It receives its action from it, and, when clutched to the sleeve of the counter-shaft, transfers the action to it and the parts dependent on it—viz., the fly-wheel, the drain-drill, the cam-wheel, and the drills. On the projection of this shaft forward of the frame we encounter, first, the cam $l$, keyed to it and operating the drain-drill. Then comes, and closes the list, the driving spur-wheel J, Figs. 1 and 2, that meshes into the spur-wheel on the hub of the cam-wheel, and thus actuates the cam-wheel itself and the drill-shafts co-operating with it.

Figures 3, 8, 9:
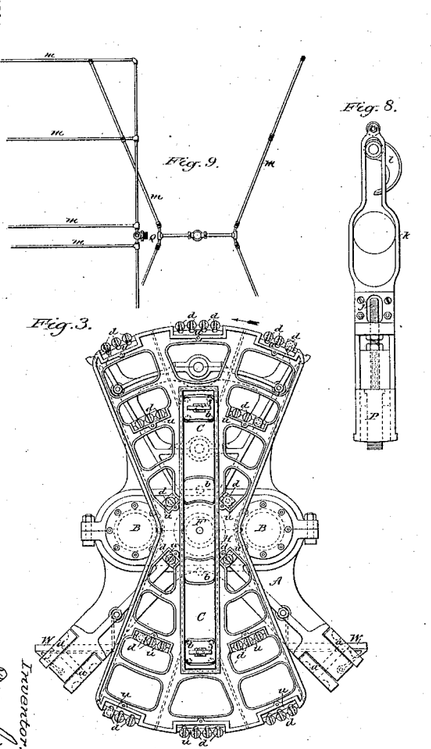
Figures 4, 5, 6, 7:
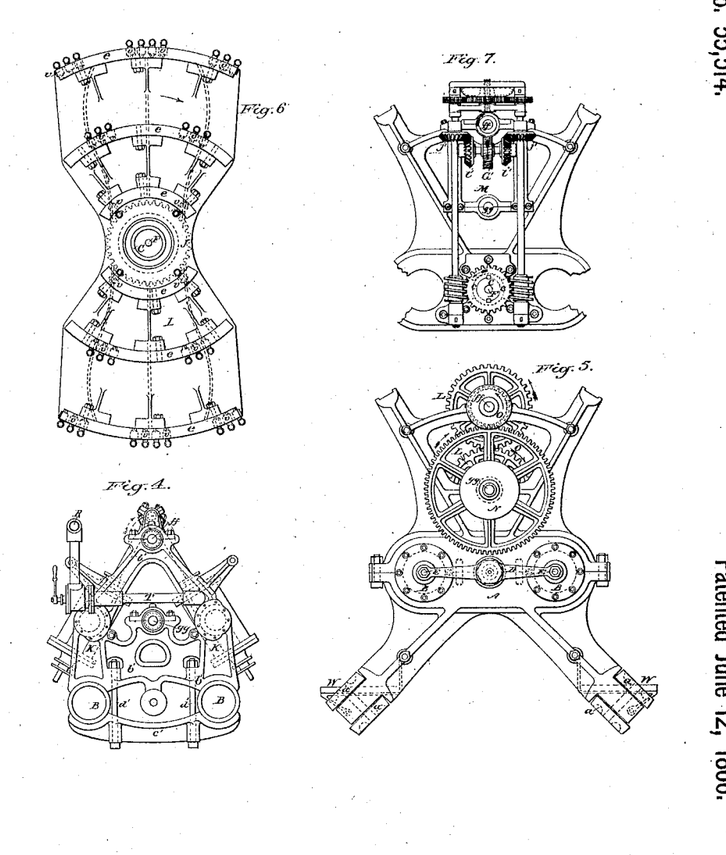
Fig. 4, oscillating engines and supporting-frame.
Fig. 5, rear end of the machine, showing gearing, &c.
Fig. 6, cam-wheel for oscillating the drill-shafts.
Fig. 7, feed-motion for revolving the ram-shaft C and the drill-wheel.
Figure 39:
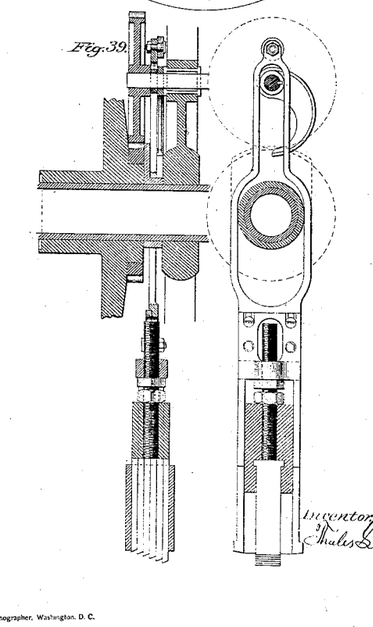
Fig. 39, drain-drill.

The drain-drill is represented in position by P in Fig. 1, also in Fig. 39, and by P in Fig. 8. It consists of a vertical jointed slotted shaft, with a wrist and a friction-roller at the top, worked by the cam $l$, and the drill-box, drills, &c., at the bottom. The drill-box is made up of an external case, forming part of the drill-shaft itself, and the drill matrix or piston, in which the drills are laid side by side and held fixed in place. This matrix is movable up and down by the right-and-left screw seen, and removable for replacing the drills by turning the screw out of the matrix, and thus permitting it to drop down out of the case. Just below the large slot or link that incloses the ram-sleeve $c'$ the junction of the two parts of the shaft is effected, as illustrated in the drawings. By loosening one of the screws the shaft is dislocated, and with the remaining bolt in position and acting as a hinge the lower half of the drain-drill may be swung up against either leg and hooked there out of the way. This is always and necessarily done during the operation of disrupting the rings and hauling out their débris. The drain-drill, in action, is lifted up by the cam $l$, and falls with its whole weight upon the path of the drain, thus working on the principle of stamping and cutting. It has two motions, one vertical, as described, and another forward, to feed it. The former, as intimated, is derived directly from the cam $l$, the latter from the axle-sleeve of the ram-shaft. It is kept and directed in its oscillations by the flanged collar, which holds the cam-wheel in place and carries the driving-wheel J out with the gear of the cam-wheel. This collar (seen in Fig. 67) is the drain-drill guide.

Following up the dependencies of the counter-shaft, the cam-wheel is next in order and in place. This is presented in position by I I in Figs. 1 and 2, in front elevation in Fig. 6, and in detail in Figs. 65 and 66. It stands between the drain-drill guide and the drill-wheel, and rests upon the axle-sleeve of the ram-shaft, as partly seen in section in Fig. 39. The drawings are so complete that any further description is scarcely necessary. Facing the front of the machine, its motion is from left to right, while that of the drill-wheel is from right to left. It takes its action from the spur-wheel J, as before stated, and imparts it to the drill-shafts, and of course the drills.

The cams are adjustable. They are severally held in place by three screw-bolts, two of which pass through transverse slots in the supporting-lugs and one through an orifice of the same. The fixed bolt, which is at the converging end of the cam, becomes a hinge on which the cam swings as a center, and as far at its opposite end as the slots in the middle and the other lug will permit. This motion may attain two or three inches. The object of this provision is very important.

The intensity of the blow delivered by a drill depends, *cæteris paribus*, on the compression of the impelling-spring of the compensating-springs of the drill-wheel. If its maximum compression be six inches, then any compression within that measure must be less than the maximum pressure and force. To adapt the blow to the nature of the rock cut, to secure a light stroke when the formation is hard and a heavy one when it is soft, and thus keep the drill in condition, either the adjustable cam must be brought in requisition or several sets of springs having respectively different powers must be provided for each drill-shaft. The expense of securing several sets and of changing these upon each modification of the heading precludes the idea of employing them and necessitates the construction and introduction of the cams set forth.

The faces of the cams are toward the plane of the wheel and inclined to it at a given angle. The upper and lower lines defining each face are parallel with each other and lie in longitudinal curved planes, every point in which upon a perpendicular drawn is equally distant from the axis of the ram-shaft.

The cam-wheel, having two wings or segments, lifts each drill-shaft twice at each revolution, and of course causes each drill to deliver two blows. This wheel takes the segmentary form, because the space opened between its wings must measurably correspond with that disclosed between the legs of the machine. The same is assertible of the drill-wheel and governs its outlines. The opening thus formed by these wheels and the main frame is a high and broad passage under a large machine, and, in case of a railroad-tunneler is spacious enough to receive a horse and his rider.

The drill-wheel, as the companion of the cam-wheel on the axle-sleeve of the ram, and as the last combination tracing its principal action to the oscillating cylinders, may now be described. Its position in the machine is seen at H H in Figs. 1 and 2, its front elevation in Fig. 3, and its details in Figs. 48, 49, 50, 51, 52, 53, 54, and 55. It revolves from right to left upon the axle-sleeve of the ram and incloses the ram-head. In it are arranged the concentric rows of drill-shafts, the drill-shaft guides, and the ram-guides. On its front face are the water-pipes, from which project the spurts for the drills. It is held in place and denied longitudinal movement upon the sleeve by the grooved collar and clutch represented in Figs. 50 and 51, the former of which is fastened to the sleeve and the latter to the rear face of the drill-wheel, as seen at P, Fig. 55.

The drill-shafts are shown in Figs. 1 and 2, and in front elevation of drill-wheel, Fig. 3. They are of two kinds, as seen in detail in Figs. 56, 57, 58, and 59. The difference between them, however, consists in a deflection near the shoulder, those working in the periphery of the wheel and next the surface of the tunnel having it, the balance not. The parts of the drill-shaft are the wrist, the body, and the shoulder. The wrist, with its friction-roller, projects to the rear of the wheel. The cam of the cam-wheel passes between it and the drill-wheel, draws it out to the lift of the cam, and then permits it to fly back.

The friction-roller is designed to lessen the friction of the contact. A longitudinal section of this roller should present sides the lines of which coincide with the radial lines of the cam-wheel.

The body of a drill-shaft is a rod having bearings in the two faces of the wheel and projecting in rear and front of it. It is deflected or not at the point noted, as the shaft belongs or does not belong to the outer tier. On it, between its bearings, is a notched collar bolted to the shaft. Its proper location is not central, but at two-thirds the distance from the rear face of the wheel. On it also, and between the bearings aforesaid, are two coiled steel springs, filling up, or nearly so, the space. The longer is compressed by the collar against the bearing in the rear face, and is the driving-spring—the one that gives velocity to the shaft and imparts momentum to the drill. The shorter is compressed by the bearing in the front face against the collar and is the receiving-spring. It gives no blow, but is designed to receive the force of one in case the drill does not expend it on the rock. The impelling and repelling springs I name the "compensating-springs." No shock is possible to the bearings in the use of them, however violent the oscillations of the drill-shafts or however frequently they beat the air.

The shoulder of the drill-shaft is somewhat thicker than the body and somewhat less in diameter than that of the drill. Its head is slightly convex, and in it is sunk a socket to receive the shank of the drill. Upon the side is a long slender spring projecting beyond the head and having a short catch or tooth near its end. The drawings show its form. Its office is to snap its tooth into a recess in the shoulder of the drill, and thus hold it firmly and prevent its displacement or escape.

The drill-shafts work in gangs, as seen in the drawings, or otherwise. Beneath each drill-shaft or gang of drill-shafts are the guides for keeping them in position and preventing rocking. These are fully exhibited in Figs. 68, 69, 70, 71, and 72, together with their relations to the notched collar above remarked.

The drills, like the drill-shafts, are an important element of the invention. The figures present them so accurately that nothing seems to be required to make them understood. It may, however, be well to add that between the head of the shaft and that of the drill packing is introduced. The flange on the head of the latter is designed to keep this cushion in place. It may also be well to add that there are three holes, ninety degrees apart, in the shoulder of each drill, into either of which the snap-spring may bite. This feature enables the drill to be turned in its socket, and thus to present the faces of the blades tangentially to the radius of the tunnel and to the central line of each channel. This quarter-revolution of the drill becomes a necessity in advancing or receding the machine, that the slight vibration the drill-wheel experiences in the movement may not cause the outer row of drills to bear against the sides of the tunnel and thus either strain them or bind the drill-wheel. Finally, it should be noticed that there are smoothing as well as cutting drills, the duty of which is to widen the channels, dress the face of the tunnel, cut triangular grooves upon each side of the bottom of the channels, and thus prevent the corners of the cutting-drills from rounding when wearing.

The number of rows of drill-shafts admissible in the drill-wheel, like the number of concentric cams in the cam-wheel, which numbers must always correspond, depends upon the size of the tunnel and cut and the nature of the rock excavated. For an excavation nine feet in diameter three tiers suffice, even in granite.

In Fig. 9, $m\ m\ m$, are presented the water-pipes and the spurts. The pipes lie upon the front face of the wheel, and are connected, as indicated in the drawings, with the central orifice of the ram-head. At this junction they are separable, and when separated the portions disposed transversely of the head are turned back like a hinge, so as to be out of the way of the ram-head when the ram is projected forward in driving the head-wedges, or is brought home to its recess in the drill-wheel. From these radial pipes, passing up to the periphery of the segments, spring the spurts at right angles, that discharge water into the respective channels to keep the drills cool, lay the dust, and wash out the chips into the drain below. These spurts are somewhat contracted at their mouths and extend nearly to the line of the ends of the drills. The supply of water to them and the pipes is regulated by a water-nut inserted in the orifice of the ram-head, and is cut off by simply turning it by hand, which is done in replacing the dulled by sharpened drills.

Figures 65, 66, 67, 72, 78:
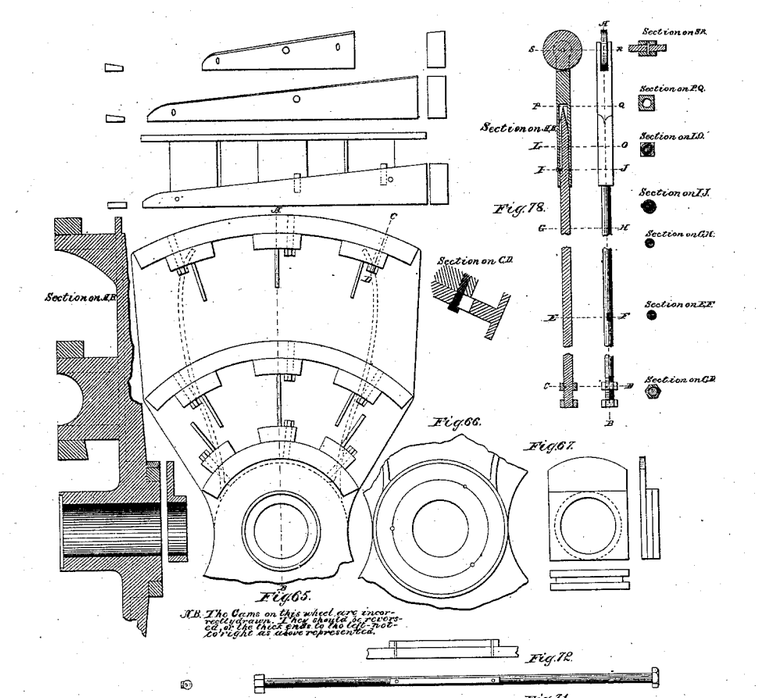
Figure 68:
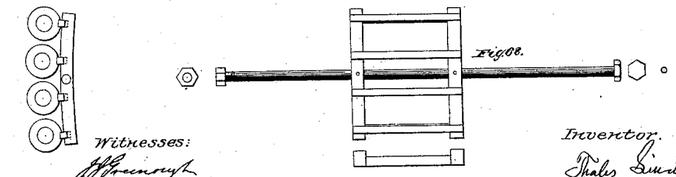
Figure 69:
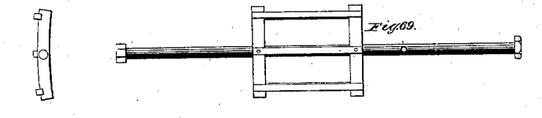
Figures 70, 71:
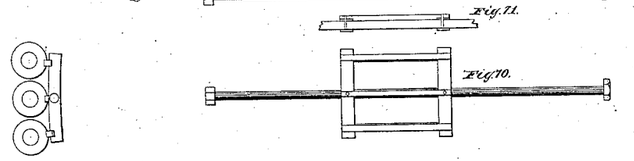

In Fig. 78 are shown the ram-guide and the drill-gage. Their position in the drill-wheel and machine is illustrated in Figs. 1 and 2, where $q$ represents the guide and $s$ the gage. In the front elevation of the drill-wheel, Fig. 3, they are again present in place.

In Figs. 1 and 2 it will be observed that the guide is a straight heavy pointed rod nutted to the rear face of the wheel, thence passing through the bottom of the recess for the ram-head, fitting closely, thence through the ram-head and the ram-hammer $b$. At the point where it leaves the hammer it is slotted and receives a key, which holds the ram to the drill-wheel. This key is removed, when the ram is set free, to strike the head-wedges in disrupting the concentric rings of rock. It is seen in Fig. 2. The office of the guide is to direct the ram-head in delivering a blow, in returning it to its recess in the face of the wheel, and to secure and preserve its connection with said wheel; also, to prevent injury to the drill-shafts. On the end of this ram-guide is the drill-gage. It consists, as may be seen, of a tubular shank fitting on the guide, and keyed in place by a set-screw or otherwise, and a short shaft, as an extension of the shank, slotted to receive and carry a friction-wheel. This wheel completes the gage, and when the drills are working presses against the bottom of the channel and slowly rolls forward on its circular path. Being connected with the guide, the drill-wheel, and the ram-head, its velocity corresponds with that of these parts. It has, like the guide, two motions, one curvilinear in the line of the channels and the other forward parallel to the axis of the tunnel or excavation. It is, as will appear, kept home at its work by pressure from the ram-cylinders communicated through the ram and the ram-guide. The extreme periphery of its friction-wheel forward—i. e., its line of contact with the bottom of the channel—is just in advance of the line of the points of the drills when the drill-shafts are free from the cams of the cam-wheel. In this position the gage enables every drill to strike and recoil, thus clearing itself from the surface of the rock.

The introduction of two or more gages is designed to average the work of the drill and to keep the bottom of the channels at all points nearly in the same plane.

When considerable disparities in the hardness of the rock are disclosed—a familiar fact— the drills, unless governed by the gages, would penetrate the softer spots more rapidly than the harder, produce serious inequalities in the bottoms of the channels, and at length cause some of the drills to drag, and so stop the machine or break it. The drill-gage is therefore to be regarded as a necessity.

We have now described the parts of the machine involved in the operations of drilling, whether concentric channels, vertical holes, or rectilinear drains, and which take their action, to a greater or less degree, from the oscillating cylinders. We now approach the parts more immediately affected by the ram-cylinders. To a considerable extent we shall find them to be the same. The action induced by these respective sets of cylinders differs in the direction it gives to the motion of the parts, the ram-cylinders in all cases, except that of the friction-wheels of the legs, producing rectilinear, while the engines, with the exception of the drill-shafts, the drain-drill, and the clamps of the drag-pulley, produce curvilinear.

Figures 40, 41:
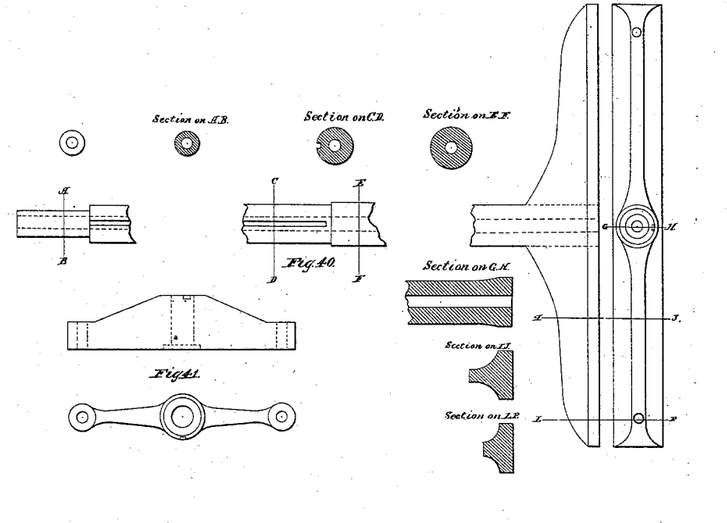
Figure 42:
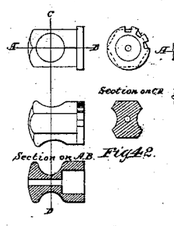
Fig. 42, toggle-nut or terminal nut of the ram-shaft.
Figures 44, 46:
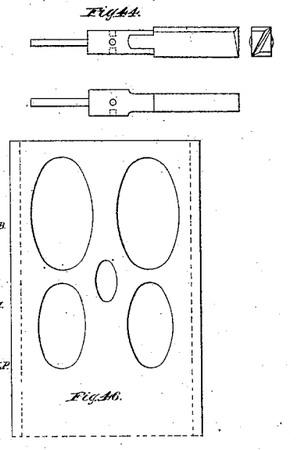
Fig. 44, smoothing-drill.
Fig. 46, side elevation of one half of drill-wheel.
Figure 45:
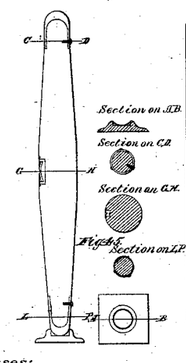
Fig. 45, toggle-leg or toggle-lever.

The ram-cylinders, through their pistons and rods, are coupled to the yoke D, shown in Figs. 1, 2, and 5, and fully represented in Fig. 41. Through this yoke passes the stem of the ram, and from it this shaft takes its motion. The stem shoulders into a recess in the yoke, and holds it in place by the toggle-nut seen in Figs. 1, 2, and 5, and fully drawn in Fig. 42. This nut is hollow, communicating on the one hand with the hole through the ram-shaft and on the other with the coupling of the water-pipe (not drawn) coming from the mouth of the tunnel or excavation. In either side of this nut are shallow sockets, designed to receive the ends of the toggle-levers seen at G G, Fig. 1, and completely illustrated in Fig. 45. The ends of these levers are convex, and exactly conform to the concavity of the sockets of the nut. Upon the external ends of them are "socket-shoes," so called, which rest against the sides of the tunnel as a bearing for the levers. In the center of each lever is a spirit or other level, inserted for determining when the levers are in position—i. e., the same horizontal plane. These levers are removable at pleasure by hand. Their office is that of struts, and is brought in requisition when the machine is to be rolled backward or forward. In Fig. 2 they are represented in place for rolling the machine back; reverse the angle of their connection with the nut, and they are in place for advancing it. This longitudinal movement of the tunneler— indeed the only one it has—is effected by knocking the grade-wedges out from under the legs, and thus resting the machine on the friction-wheels, and by letting the air into the ram-cylinders either before or behind the pistons, as may be required. The ram being restrained by the struts, the machine must move, and does move, at any speed required.

Figure 47:
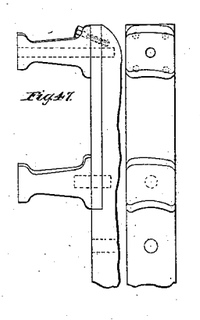
Fig. 47, ram-hammers or ram-horns for striking the head-wedges.

The ram is shown in Figs. 1 and 2 at C C, and with details in Fig. 40. Through it, from end to end of the stem, is a hole for receiving water from the supply-pipe and conveying it through the machine and to the pipes in the drill-wheel, and thence to the nozzles of the spurts. On its head (see Fig. 47) are planted horns or hammers, which, in disrupting the rings of rock, are brought in contact with the heads of the splitting-wedges. Through the ram-head and the hammers are orifices, which the ram-guides thread, that the rectilinear motion of the ram head and horns.

The ram, taken with its hammers, may be regarded as discharging three principal offices in rectilinear motion, viz: first, that of moving the drill-gages, drill-wheel, and other parts dependent on the axle-sleeve forward and backward; second, that of driving home the head-wedges in disrupting the rings; third, that of advancing and retiring the whole machine. To enable it to do the first the keys are inserted in the ram-guides; to perform the second the ram is freed by removing said keys, and to effect the third the toggle-levers are applied. In curvilinear motion it revolves the drill-wheel and all its working parts—i. e., the drill-shafts, the drills, and the drill-gages.

At this point in the specification attention may be called to the wedge-index and the head-wedges.

Figures 10, 11, 12, 13, 14, 15, 16:
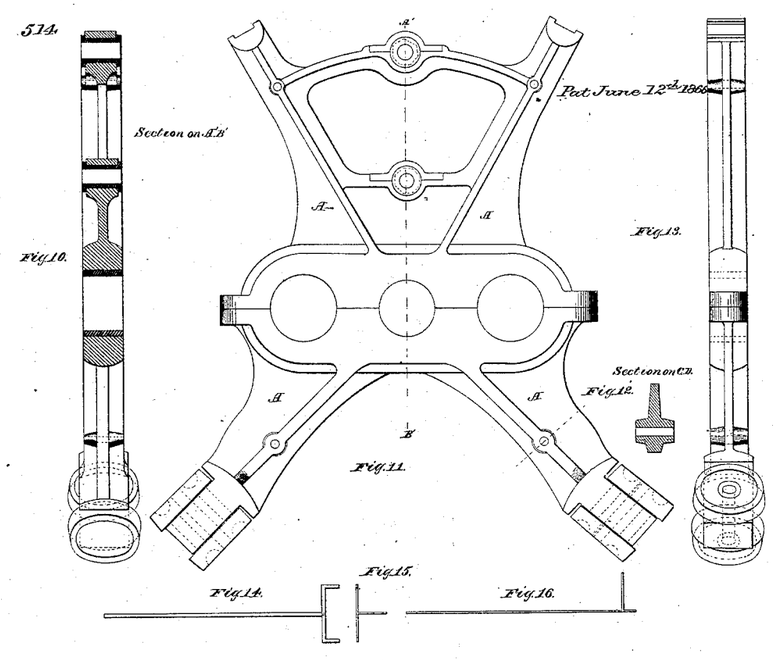

In Fig. 1, at Z, and in Figs. 14, 15, and 16 is presented the wedge index or indicator. It is used only in disrupting the rings of rock and for the purpose of determining where a head-wedge must be placed in a channel to receive a central flow from the ram-hammer. Its base is set on the face of a hammer, and its index, being at right angles to the base and central to it, points out the place where the head-wedge should be inserted. It is a very necessary and useful instrument, and when not in requisition is suspended on the front face of the drill-wheel.

Figure 48:
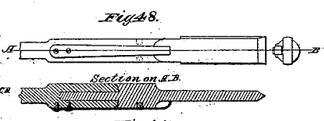
Figures 48, 49, 50, 51, 52, 53, 54, 55, 56, 57, 58, 59, 60, 61, 62, 63, 64:
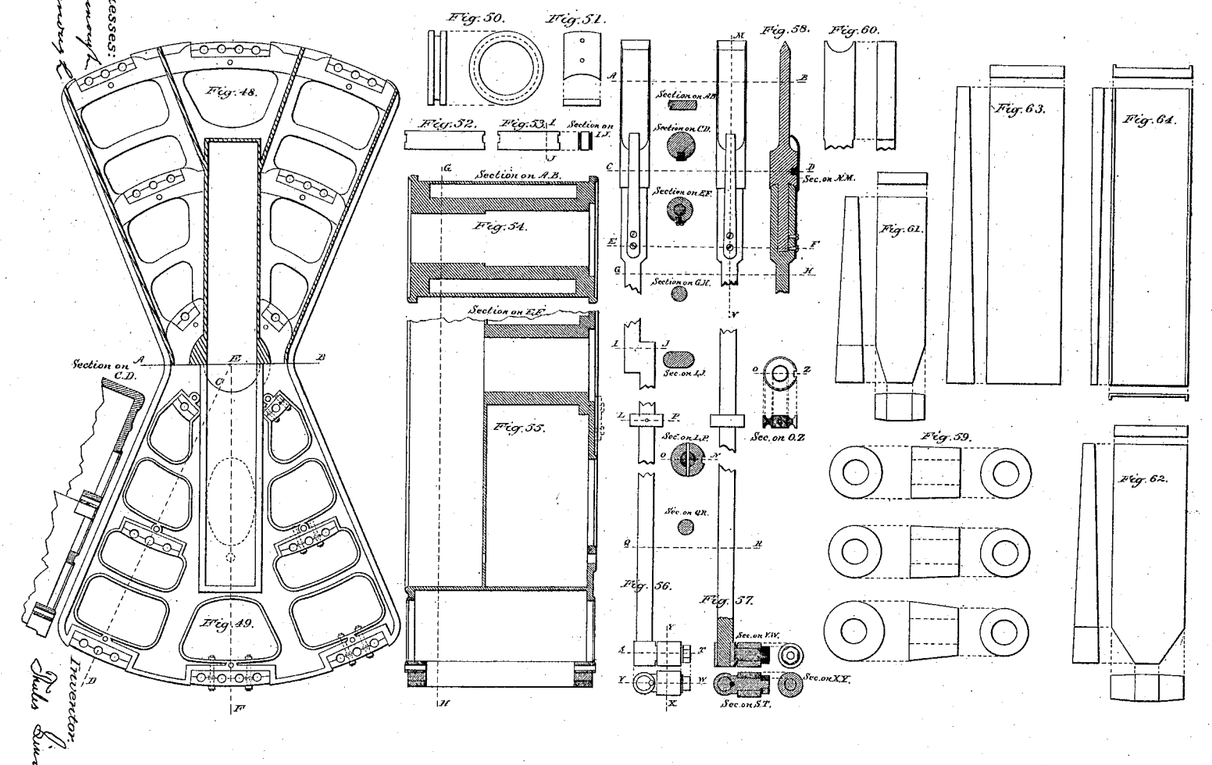

The head-wedge is seen in Figs. 63 and 64. It consists of a wedge proper and two rectangular grooved matrices, between which and in whose grooves the real wedge is driven. Each matrix has the same angle of convergence as the wedge. Hence when the three are *in situ* the head-wedge is complete and is of uniform breadth and thickness from end to end. With a convergence of one-fourth of an inch to the foot the wedge has an immense disruptive power under the blows of the ram. In using it the matrices are first inserted to the bottom of the channel, then the wedge is pushed in between them as far as possible by hand. Two of the head-wedges are employed in splitting, placed at opposite points in the channel. When properly seated they are ready for a blow of the ram.

Of the grade and key-wedges we have spoken.

The longitudinal and transverse levels of the machine are determined by instruments for that purpose affixed to the inside of the front support of the frame (not seen in the drawings) and made part of the tunneler. The one indicates and preserves the grade of the excavation, and is called the "grade-level." The other ascertains when the axial lines of the ram-shaft and of the ram-cylinders are in a horizontal plane, and is called the "plane-level." Reference to these standards by the operator enables him to know at all times when the machine is in its true position for work.

The supply and other pipes for the admission of air to and emission from the cylinders are exhibited in Figs. 1 and 2, and particularly in Figs. 34, 35, 36, and 37. In these drawings are also exhibited the cocks and valves. The hand-lever that works the ram-cylinder valves, together with its connecting-rods, is also shown. The general supply-pipe is R, Figs. 1 and 2. The exhaust-pipes for the ram-cylinders are seen at n n in Fig. 1. Those of the oscillating cylinders, which discharge also below the line of the platforms, are not apparent in the drawings.

Upon either side of the machine is constructed a platform, extending between the legs and supported by these and the leg-rod. These platforms are shown by W in Figs. 1, 2, and 5 in elevation, plan, and section. They are for the convenience of the engineer in the manipulations of the hand-lever, &c., and are an essential part of the machine. They are approached by iron stirrup-steps on the rear legs and are removable at pleasure.

The machine is protected against damage by water falling upon it from the arch of the excavation. Over the main frame, and extending somewhat beyond it at either end, is a canopy consisting of sheet metal or other suitable material, which completely lines the upper half of the tunnel and prevents the discharge of drops or jets upon the structure. Its points of support are the legs and the arms, and it partakes of the longitudinal motion of the machine. Over the drain-drill, cam-wheel, and drill-wheel is also a similar canopy, resting upon a forked crane, which springs from the rear face of the drain-drill guide and is fastened to it. This canopy from the seat of its support partakes of the oscillating motion of the axle-sleeve and the cam and drill wheels revolving upon it, and thus protects them when at work as well as at rest.

To render the description of the machine under consideration clear and full, it remains to describe its leading operations. Three of these must suffice, viz: first, to cut concentric channels in the heading; second, to disrupt the rings and core of rock; third, to detach and load the fragments. I select these three operations, not because they are less complicated than others, but because the machine can perform but one of them at the same time. Each of these operations, to be understood, should be divided into two parts— the preparatory steps and the executive ones, the former beginning with the last act of the preceding operation. Thus, to cut the channels we must take the machine as found upon finishing the removal of the débris; to disrupt the rings we must take it as left upon completing the channels; and to haul out the fragments of the rings we must take it as conditioned upon closing the desruption of the rings. Again, each of the operations is or may be accompanied by others, but these it is not intended to more than notice.

*Operation of cutting channels.*—Preparation: Drive back the key-wedges from the arms and knock out the grade-wedges from the legs, project the ram forward the required distance, insert the toggle-levers and adjust them, touch the hand-lever of the valves, and let the air in before the pistons of the ram-cylinders till the machine has advanced to the assigned point; then reverse the action of said lever. (This may take the machine up to its work. If it does not, another advance will.) Remove the toggle-levers and proceed to bring the axis of the ram-shaft into coincidence with the axis of the excavation. To this end insert the grade-wedges and drive them till the grade and plane levels indicate the coincidence just noted. Next replace the key-wedges, and the machine becomes again vised firmly in its proper place. Unclutch the drum of the drag pulley, clutch the worm of the crank-shaft and the counter gear of the counter-shaft, adjust the channel-drills with their blades radial to the drill-wheel, draw back the ram-head into its recess, push in the keys of the ram-guides, restore the connection of the water-pipes with the central orifice of the ram-head, replace the drill-gages and adjust them to the maximum stroke of the drills, reduce the dislocation of the link-shaft of the drain-drill, hang up the ropes and clamps of the pulleys upon the legs, quietly let in the compressed air behind the pistons of the ram-cylinders and slowly move the ram forward till the friction-wheels of the drill-gages touch the bottoms of the channels in which they run, turn the stop-cock of the water-pipe attached to the stem of the ram, and if a hole in the top of the excavation is required clutch the driving-pinion of the bracket-drill. The machine is now ready for action, a single turn of the supply-cock for the oscillating cylinders being all that is demanded to put it in motion. And when it is in motion it will perform, among others, three things: cut channels in the heading, extend correspondingly the drain-trench in the bottom of the excavation, and drill a hole in the crown of it.

Execution: In executing the operation under review the work required of the engineer and his assistant consists in lubricating assigned parts of the machine, in replacing dulled by sharpened drills, in retiring and advancing the drill-wheel for this purpose, in cutting off thereupon and restoring the supply of water, in unclutching the driving-pinion of the bracket-drill when it has bored its hole, in clutching the corresponding pinion to withdraw the drill from its orifice, and, when withdrawn, in unclutching the same.

Before describing the *modus operandi* on admitting the motor to the oscillating cylinders it is well to premise that three distinct results are accomplished—*i. e.*, setting the drain and the bracket drills aside. This operation embodies three distinct and important ones, viz: first, that of oscillating the drills and causing them to strike; second, that of carrying them round the circle of the channels, so that the same drill never strikes two consecutive blows in the same place; third, that of advancing them forward in the line of the excavation precisely as fast as they chip away the rock. The first and second of these branch operations take their origin from the oscillating cylinders; the third from the ram-cylinders.

(*a.*) The parts worked in the execution of the first branch are the following: the oscillating cylinders, the crank-shaft, the driving-wheel of the same, the counter-wheel of the counter-shaft, the counter-shaft itself, its balance-wheel, the driving-wheel thereof, the spur-gear of the cam-wheel, the cam-wheel itself, its adjustable cams, the wrist friction-rollers of the drill-shafts, the shafts themselves, the compensating-springs, the drill-shaft guides, and the drills. These are the links in the chain of this operation. They ultimate in the oscillations of the drills, but not in either of the two movements of which the drill-wheel is capable—viz., that of revolution upon the ram-sleeve, and indirectly upon the ram as an axis, and that of progress forward with the ram in the line of the tunnel.

(*b.*) The parts worked in the execution of the second branch—*i. e.*, in presenting the drills at every point in the circle of the channels—are the following: the oscillating cylinders and the crank-shaft as in one, then the worm of the same, the worm and beveled gear of the feed-motion, the vertical shafts of the same, the worms thereon, together with the worm-wheel of the ram-shaft, the ram, the ram-guides, and the drill-wheel. These are the links in the chain of this operation. They ultimate, not in the oscillations of the drill-shafts, as in (*a*,) but in the revolution of the drill-wheel, and of course in giving the feed to the drills.

(*c.*) The parts worked in the execution of the third branch—*i. e.*, in pushing the drills forward into the heading—are the following: the pistons of the ram-cylinders, the ram, and the long ram-sleeve, together with the counter or telescopic shaft, the drain-drill, the cam-wheel, with the appendant ram-guides and drill-gages. These are the links in the chain of operation. They ultimate in no oscillation of the drill-shafts, as in (*a*,) nor in any revolution of the drill-wheel, as in (*b*,) but in a direct forward movement of the ram, the long ram-sleeve or axle-sleeve of the ram, and the cam-wheel, the drill-wheel, &c., resting upon the sleeve, including, of course, the drill-gages. The progress of this movement exactly corresponds with that in which the concentric channels are sunk, and is consequently commensurate with it.

With this brief analysis the three motions of the drill-shafts—viz., the oscillating, the feed, and the progressive—become intelligible and the *modus operandi* of cutting the channels illustrated.

The channels having been cut to the required depth, the next step is the operation of disrupting the rings and core.

Preparation: Touch the valve-lever and bring the drill-wheel, &c., as far back toward the frame as possible. By branch (a,) operation 1, turn the segments of the cam-wheel round till their central line is in a horizontal plane, unclutch the counter-gear of the counter-shaft, cut off the supply of water to the spurts, dislocate the shaft of the drain-drill and swing it up on one of the legs, disconnect the water-pipe of the spurts with the orifice of the ram, remove the drill-gages, turn the outer tier of drills ninety degrees in their sockets, draw the keys of the ram-guides, apply the wedge-index to locate the head-wedge, plant said wedge in next the outer channel, and then its correspondent precisely opposite, as indicated by the wedge-index.

Execution: Oscillate the ram slightly to see that it is free; then rapidly pull the valve-lever and let the ram shoot against the head-wedges, thus giving new positions to the head-wedges in the same channels, revolve the ram-head in correspondence and hurl the ram-hammers upon them, so continuing till the outer ring of rock is fractured from its entire base. From this ring proceed to and with the next in the same manner, and so on till all the rings in the heading are disrupted. The cylindrical core left is knocked off by the ram after the débris of the rings is removed. To effect this a straight massive lever long enough to reach from the side of the tunnel to the core and one of the head-wedges is required. One end of the lever is placed against the circumference of the tunnel, and the other, with a head-wedge interposed, against the top of the core. A tap from the ram breaks off the core by the lateral strain, and thus all the heading is released. Hence, strictly, there are two disruptions and two removals, the former alternating with the latter. The parts worked in splitting off the rings and the core are the following: the valve-lever with its connections, the ram-cylinders with their belongings, the ram, the wedge-index, the head-wedges with their matrices, and a common lever of requisite length and stiffness.

The rings of rock having been fractured from their bases and broken into fragments, the next step is the operation of removing the fragments and loading them on the cars.

Preparation: Loosen the key-wedges and knock out the grade-wedges, insert the toggle-levers and adjust them, let in the air behind the pistons of the ram-cylinders and thus draw the machine back the distance required, level, as heretofore instructed, tighten the key-wedges and remove the toggle-levers, bring the segments of the drill into a horizontal position and in correspondence with those of the cam-wheel, move the stone-car into place, attach its draw-bridge, hook the car to the legs of the machine. There being two pulleys, a choice of further preparation may at this point be had. The drag-pulley derives its power from the oscillating cylinders, while the snag-pulley draws its force from the ram-cylinders. Both pulleys, if need be, can work at the same time, and thus double the efficiency of their action. If the drag-pulley be preferred, unclutch the worm of the crank-shaft and also the drum, take down the rope and clamps of the pulley from their place on the leg and carry them forward under the machine to the heading; apply the clamp to the fragment to be first detached.

Execution: Clutch the drum to its driving-wheel, let the air into the oscillating cylinders and permit them to run till the piece of rock is hauled up the draw-bridge and delivered on the car. Then unclutch the drum, clamp another fragment, clutch and haul as before, and so on till every considerable piece of rock is loaded. Pick up the small pieces by hand and sweep the tunnel and channel when done. If the snag-pulley is preferred, move the ram forward as far as desired, take down the tackle and clamp, carry them under the machine, over the car and draw-bridge, as before, to the heading, seize with them the fragment wanted, and then move the ram back till the stone is dragged up the draw-bridge and on board the car. So keep clamping and hauling till all the heavy pieces are disposed of. Then gather up the remaining débris by hand and sweep out the tunnel and channels, as before. When the rings of rock are removed the core is knocked off, hauled upon the car, the area in front reswept, the draw-bridge slung up, the last car moved out, and preparations for cutting channels renewed.

Having thus set forth my method of tunneling and the machinery by which it is executed, what I claim therein as my invention, and for which I desire to secure Letters Patent, is—

1. The drill-gage, substantially as and for the purposes specified.

2. The ram-guide, in combination with said gage, the ram, and the drill-wheel, substantially as herein specified.

3. Constructing the drills and the drill-shafts and connecting the same, substantially as set forth.

4. The combination of the compensating-springs with the drill-shafts, substantially as set forth.

5. The drill-shaft guides and the notched collars between the compensating-springs, substantially as specified.

6. The water-pipes and jets, in connection with the drill-wheel and ram, substantially as set forth.

7. The combination of parts forming the drill-wheel, substantially as set forth.

8. The grooved collar upon the long ram-sleeve and the clutch attached to the rear face of said drill-wheel and working its said collar, substantially as herein specified.

9. The ram and the ram-hammers, substantially as herein described.

10. The wedge-index, in connection with said hammers or their equivalent, together with the splitting apparatus, substantially as set forth.

11. The cam-wheel and its adjustable cams for working the drills, substantially as set forth.

12. The drain-drill and the collar upon the long ram-sleeve, which serves as its guide, constructed and arranged substantially as described.

13. The non-revolving of the ram-sleeve aforesaid and the non-revolving of the short ram-sleeve of the rear frame of the machine, as specified.

14. The combination of the valves receiving the compressed air to the ram-cylinders and the valves discharging it from them with a hand-lever, so as to control the action of the ram, &c., by a touch of the engineer, substantially as set forth.

15. The construction of the platforms upon the legs of the machine, substantially as described.

16. The supporting of the machine upon friction-wheels beveled upon their face, substantially as set forth.

17. Moving the drilling apparatus back and forward by means of the ram-cylinders and their connections, substantially as set forth.

18. Moving the ram back and forth at any velocity desired by the engineer by means of the ram-cylinders and their dependencies, substantially as specified.

19. Moving the machine by means of said ram-cylinders and the toggle-levers, substantially as set forth.

20. The toggle-levers and their necessary appendages, substantially as set forth.

21. The bracket-drill constructed and operating substantially as specified.

22. The hauling out of the débris by means of the drag-pulley and its appendages, substantially as specified.

23. The hauling out of the débris by means of the ram and the tackle and clamps appended, substantially as specified.

24. The combination whereby the ram and the drill-wheel are united and revolved, substantially as set forth.

25. In combination with a machine constructed substantially as herein set forth, the method of leveling the same transversely of the tunnel and of adjusting it to the grade-line of the excavation, as herein specified.

26. The combinations by which the ram-cylinders operate without the oscillating cylinders or in conjunction with them, and vice versa; by which the bracket-drill works independently of the drill-wheel or simultaneously with it; by which the drag-pulley hauls rock independently of or contemporaneously with the snag-pulley, and vice versa; by which the drill-wheel revolves without the cam-wheel or in conjunction with it; by which the ram-cylinders, through the toggle-levers, may move the machine forward and backward while the oscillating cylinders, through the drag-pulley, are hauling out rock from the heading; by which the drills are kept home to their work and at the point of maximum action, and by which the bottoms of the concentric channels are kept relatively in the same plane, whatever the disparities in the hardness of the rock cut; by which the ram is permitted, at the will of the engineer, to move independently back and forth and without shock to the machine from the oscillations; by which the drills for the heading are kept cool the dust from them laid, and their minute chips swept out of the concentric channels into the common drain; by which a drain is cut in the bottom of the tunnel parallel with and directly under the axial line of the same; by which the machine progresses forward and backward with or without the convenience of a railroad, and by which the tunnel, adit, &c., are supplied with an abundance of fresh air and water; by which, finally, the drill-wheel, the cam-wheel, the ram, the bracket-drill, the drag-pulley, the snag-pulley, the ram-cylinders, the oscillating cylinders and other parts may operate concurrently and otherwise, all of which are substantially as presented.

THALES LINDSLEY.

Witnesses:
J. J. GREENOUGH,
CHAS. T. CHURCH.